US012410902B1

(12) United States Patent
Tai et al.

(10) Patent No.: US 12,410,902 B1
(45) Date of Patent: Sep. 9, 2025

(54) VEHICLE LAMP

(71) Applicant: MIN HSIANG CORPORATION, Tainan (TW)

(72) Inventors: Shang-Kuei Tai, Taipei (TW); Ying-Fang Tseng, Changhua County (TW); Kun Yeh Lin, Tainan (TW); Tung Sheng Hsieh, Tainan (TW)

(73) Assignee: MIN HSIANG CORPORATION, Tainan (TW)

( * ) Notice: Subject to any disclaimer, the term of this patent is extended or adjusted under 35 U.S.C. 154(b) by 0 days.

(21) Appl. No.: 18/932,349

(22) Filed: Oct. 30, 2024

(51) Int. Cl.

| | |
|---|---|
| ***F21S 45/48*** | (2018.01) |
| ***F21S 41/20*** | (2018.01) |
| ***F21S 41/39*** | (2018.01) |
| ***F21S 43/20*** | (2018.01) |
| ***F21S 43/37*** | (2018.01) |
| ***F21V 19/00*** | (2006.01) |
| ***F21Y 115/10*** | (2016.01) |

(52) U.S. Cl.
CPC ........... *F21S 45/48* (2018.01); *F21S 41/2805* (2024.05); *F21S 41/39* (2018.01); *F21S 43/265* (2024.05); *F21S 43/37* (2018.01); *F21V 19/0055* (2013.01); *F21Y 2115/10* (2016.08)

(58) Field of Classification Search
CPC ........ F21S 45/48; F21S 41/2805; F21S 41/39; F21S 41/19; F21S 41/192; F21S 43/265; F21S 43/37; F21S 41/145; F21S 41/147; F21Y 2115/10; F21V 19/0055; F21V 15/01
See application file for complete search history.

(56) References Cited

U.S. PATENT DOCUMENTS

| | | | | |
|---|---|---|---|---|
| 10,267,476 B2 * | 4/2019 | Ugajin | F21S 41/255 |
| 10,753,565 B1 * | 8/2020 | Patel | F21S 41/36 |
| 2012/0182750 A1 * | 7/2012 | Chung | F21S 41/19 362/509 |
| 2018/0363874 A1 * | 12/2018 | Kawai | F21S 41/151 |
| 2020/0248884 A1 * | 8/2020 | Iwasaki | F21S 41/36 |

FOREIGN PATENT DOCUMENTS

| | | |
|---|---|---|
| TW | M409195 U | 8/2011 |
| TW | M496724 U | 3/2015 |
| TW | 201702519 A | 1/2017 |

* cited by examiner

*Primary Examiner* — Erin Kryukova
(74) *Attorney, Agent, or Firm* — Best & Flanagan LLP

(57) ABSTRACT

A vehicle lamp comprises a housing including a rear wall and an annular wall located in front of and connected to the rear wall. A chamber between the annular wall and the rear wall includes a front end having an opening. A carrier seat protrudes from an inner surface of the annular wall into the chamber and includes a mounting face facing the chamber. The annular wall includes an assembling opening facing the mounting face. A circuit board disposed on the mounting face includes at least one light emitting element and at least one first mounting hole. An optical element is disposed in the chamber to guide light rays emitted by the at least one light emitting element. A front cover is coupled with the housing and substantially seals the opening. A vertical projection of the at least one first mounting hole is substantially located in the assembling opening.

20 Claims, 8 Drawing Sheets

VEHICLE LAMP

BACKGROUND OF THE INVENTION

The present invention relates to a vehicle lamp and, more particularly, to a vehicle lamp which provides an enhanced cooling effect and which is easily assembled.

A conventional vehicle lamp generally includes a cooling device to avoid the light emitting element from being damaged due to overheating. For example, Taiwan Utility Model TWM409195 discloses a vehicle lamp structure mainly including a housing, an LED light source module, a thermally conductive seat, a reflective cover, and a light transmitting cover. The housing is made of better thermally conductive material and includes a receiving portion assembled with a circuit board by fasteners. The thermally conductive seat is made of better thermally conductive material and includes mounting plates securely fixed to the housing by fasteners. The thermally conductive seat is also assembled by fasteners to the LED light source module. The LED light source module is electrically connected to the circuit board, such that the heat generated during operation of the LED light source module can be transferred through the thermally conductive seat to the housing where the heat is dissipated.

However, in the above assembly, an air gap exists in a connection area between the LED light source module and the thermally conductive seat, and another air gap exists in a connection area between the thermally conductive seat and the housing. These two air gaps reduce the thermal transfer effect and, thus, reduce the cooling effect.

Taiwan Utility Model No. TWM496724 discloses a vehicle lamp structure including a housing, a reflective cover, an LED lamp unit, a shielding cover, and a lamp cover. The housing is made of metal and includes a front portion and a rear portion. A platform is disposed on the rear portion and includes a connecting portion connected to by bolts to the LED lamp unit. Then, the front portion is assembled with the rear portion. Next, the reflective cover, the shielding cover, and the lamp cover are assembled in sequence to finish the vehicle lamp.

The housing includes separable front and rear portions, such that when the LED lamp unit is disposed on the platform of the front portion, the platform is not covered to permit use of tools for assembly. Furthermore, after assembly, the front portion is assembled to provide a larger area for the housing for cooling purposes. However, an air gap exists in the connection area between the LED lamp unit and the connecting portion of the platform, and another air gap exists in the connection area between the front portion and the rear portion, leading to a poor cooling effect of the housing.

Taiwan Patent Publication No. 201702519 discloses a vehicle lamp including a reflecting cover, a partitioning board, an LED circuit board, a shielding board, and a front fixing seat. The reflecting cover includes a lower cover and an upper cover. The partitioning board may dissipate heat and includes heat dissipating fins on a rear end thereof. In assembly, the LED circuit board is firstly disposed on the partitioning board. Then, the upper cover is assembled with the lower cover, and the partitioning board is located in a central portion of the upper and lower covers. Next, the shielding board and the front fixing seat are assembled.

However, the heat sources on the LED circuit board are merely cooled by the partitioning board with a small area, resulting in a poor cooling effect.

BRIEF SUMMARY OF THE INVENTION

An objective of the present invention is to provide a vehicle lamp which provides an enhanced cooling effect and which is easily assembled.

In a first aspect, a vehicle lamp according to the present invention is configured to be mounted on a vehicle body. A first direction is defined in a front/rear direction of the vehicle body. The vehicle lamp comprises a housing, a circuit board, an optical element, and a front cover. The housing includes a rear wall and an annular wall located in front of the rear wall and connected to the rear wall. A chamber is defined between the annular wall and the rear wall and includes a front end having an opening. The annular wall includes an inner surface. A carrier seat protrudes from the inner surface into the chamber. The carrier seat includes a mounting face facing the chamber. The annular wall includes an assembling opening facing the mounting face. The circuit board includes at least one light emitting element and at least one first mounting hole. The circuit board is disposed on the mounting face. The optical element is disposed in the chamber and is configured to guide light rays emitted by the at least one light emitting element. The front cover is coupled with the housing. The front cover substantially seals the opening. A vertical projection of the at least one first mounting hole is substantially located in the assembling opening.

In an example, the vehicle lamp further comprises at least one assembling element. The mounting face is provided with at least one second mounting hole. The at least one assembling element extends through the at least one first mounting hole of the circuit board and the at least one second mounting hole of the mounting face of the carrier seat to assemble the circuit board with the carrier seat.

In an example, the assembling opening is in the form of a first notch facing forward.

In another example, the assembling opening is the form of a hole.

In an example, the mounting face is planar and is substantially parallel to the inner surface of the annular wall on which the carrier seat is located.

In an example, the mounting face is planar and is substantially at a non-parallel angle to the inner surface of the annular wall on which the carrier seat is located.

In an example, the housing and the carrier seat are integrally formed and are made of metal or include a material with high thermal conductivity.

In an example, the housing includes a plurality of heat dissipating fins protruding from an outer surface of the housing.

In an example, the optical element includes at least one first sidewall and at least one second sidewall connected to the at least one first sidewall. The at least one first sidewall and the at least one second sidewall of the optical element are bonded to the inner surface of the annular wall by a glue.

In an example, claim the at least one second sidewall is aligned with the assembling opening.

In an example, the first sidewall of the optical element is disposed annularly and faces the inner surface of the annular wall. Furthermore, an extending direction of the first sidewall is at an angle of about 75 degrees to the first direction.

In an example, the at least one second sidewall includes two second sidewalls protruding toward the inner surface of the annular wall. A spacing between the two second sidewalls decreases gradually toward a rear end of the optical element. An extending direction of each of the two second sidewalls is at an angle of about 30 degrees to the first direction.

In an example, the at least one second sidewall includes two second sidewalls protruding toward the inner surface of the annular wall. A spacing between the two second sidewalls decreases gradually toward a rear end of the optical element. An extending direction of each of the two second sidewalls is at an angle to the first direction. The angle is smaller than 90 degrees and not smaller than 30 degrees.

In an example, the glue is annularly and continuously applied to the inner surface of the annular wall of the housing.

In an example, the front cover includes an outer frame and a light-transmitting lens. The light-transmitting lens is disposed in a central portion of the outer frame. The outer frame includes a shielding portion protruding rearward to cover the assembling opening.

In an example, the optical element is a reflecting cover.

By the provision of the assembling opening, when the circuit board is disposed on the mounting face of the carrier seat, rapid assembly may be achieved by extending the external assembling device through the assembling opening, thereby providing easy assembly. Furthermore, the heat sources generated by the light emitting element may be transferred through the circuit board to the carrier seat and then to the housing for cooling purposes. The heat transfer path includes only one air gap, thereby providing a better heat transfer efficiency. Furthermore, the housing according to the present invention is a single piece with a larger cooling area, thereby enhancing the cooling effect. Furthermore, according to the present invention, the glue is annularly and continuously applied to the inner surface of the annular wall of the housing, such that the housing, the optical element, and the front cover are coupled together as an integral member, thereby providing stable assembly.

In another aspect, a vehicle lamp according to the present invention comprises a housing including a chamber, an inner surface, and an assembling opening. A carrier seat is disposed on the inner surface and includes a mounting face aligned with the assembling opening. A circuit board is disposed in the chamber. An optical element is disposed in the chamber. A front cover substantially covers the chamber. A vertical projection of at least a portion of the mounting face is substantially located in the assembling opening.

In a further aspect, a vehicle lamp according to the present invention comprises a housing including a chamber, an inner surface, and an assembling opening. The inner surface includes a mounting face aligned with the assembling opening. A circuit board is disposed in the chamber. An optical element is disposed in the chamber. At least one assembling element and the circuit board are assembled on the mounting face by an external assembling device through the assembling opening.

The present invention will become clearer in light of the following detailed description of illustrative embodiments of this invention described in connection with the drawings.

DETAILED DESCRIPTION OF THE INVENTION

Figure 1:
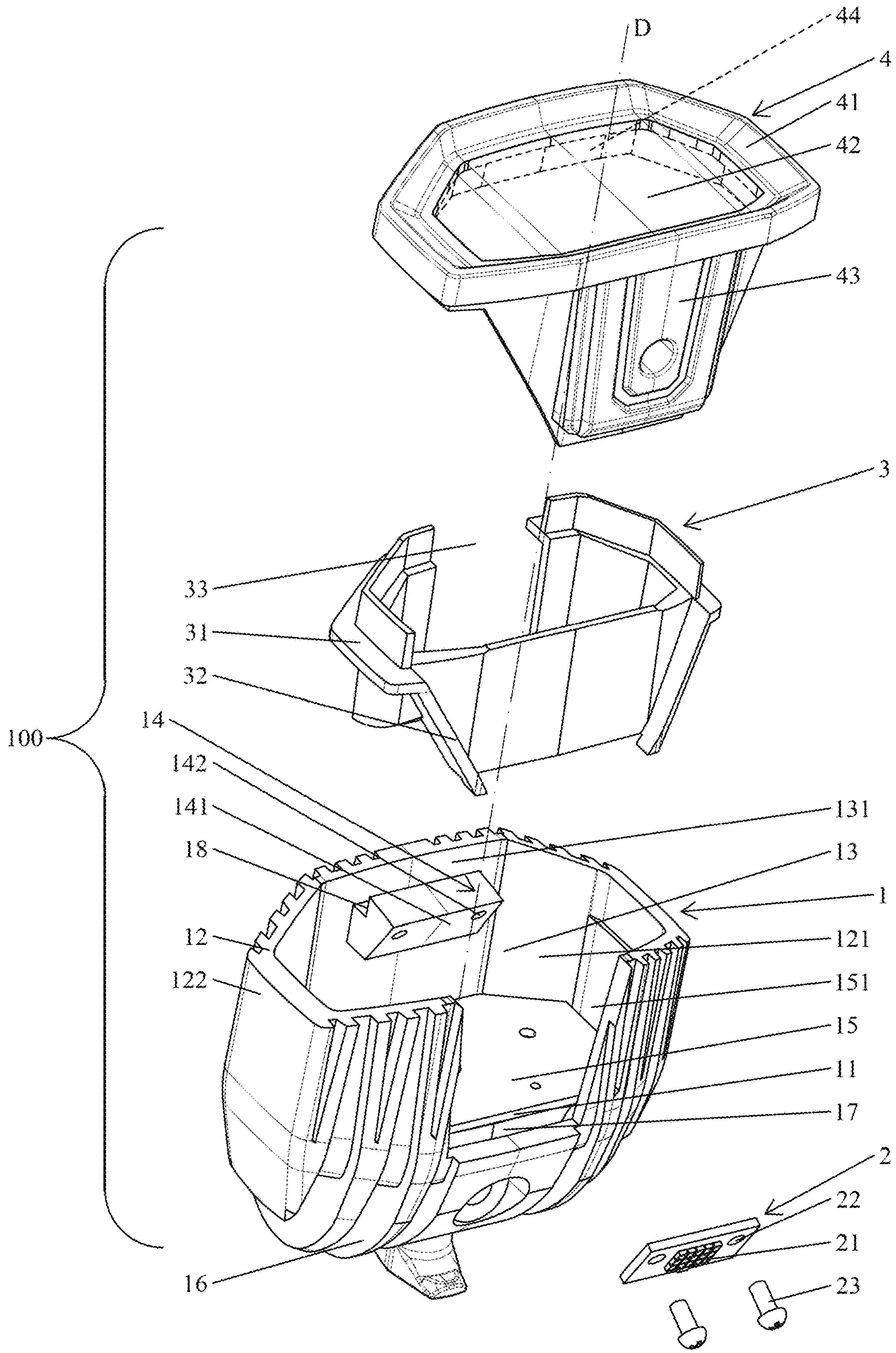
FIG. 1 is an exploded, perspective view of a vehicle lamp according to the present invention.
Figure 2:
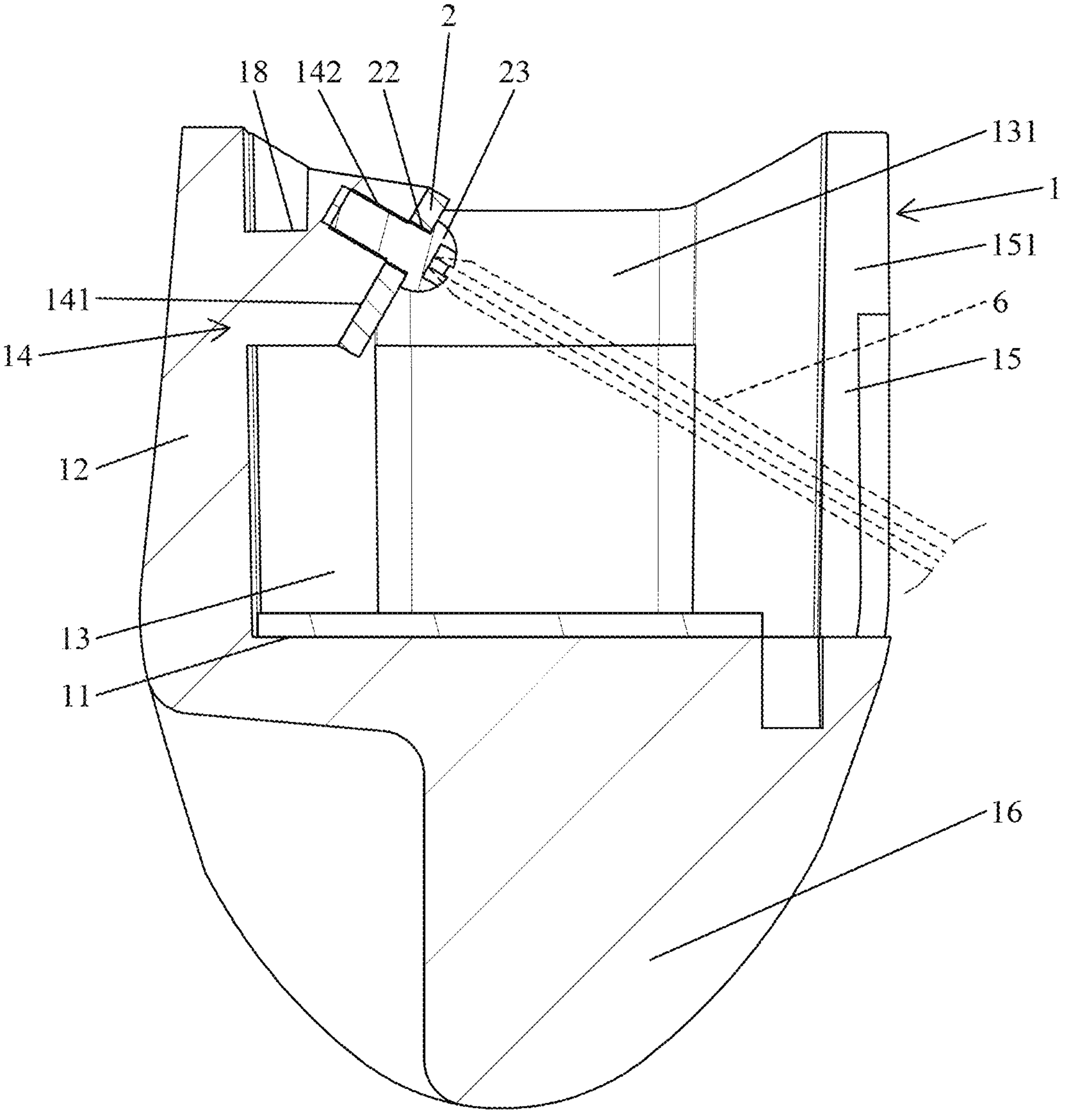
FIG. 2 is a schematic view illustrating assembly of a housing and a circuit board of the vehicle lamp according to the present invention.
Figure 3:
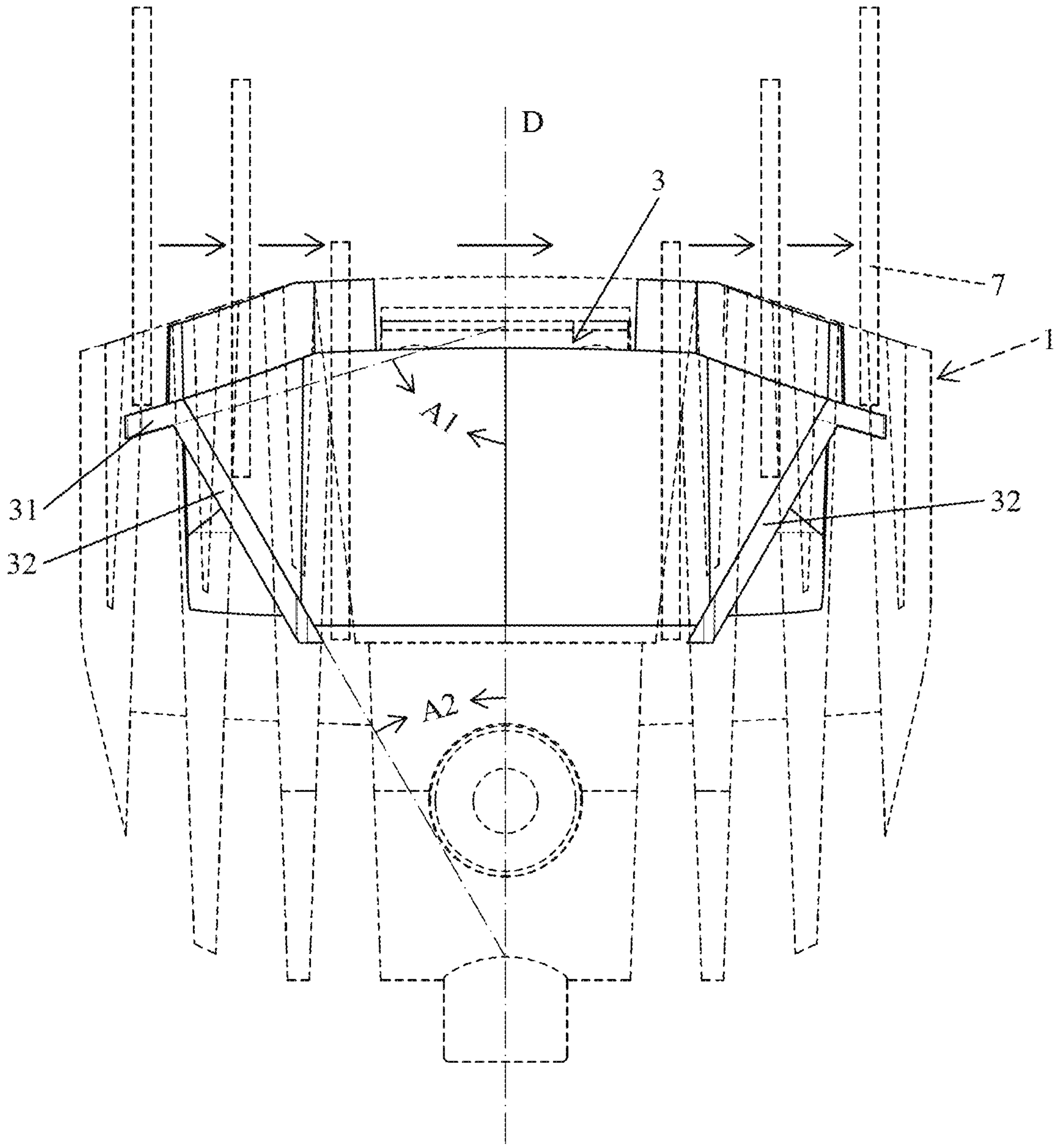
FIG. 3 is a schematic view illustrating gluing of the housing and an optical element of the vehicle lamp according to the present invention.
Figure 4:
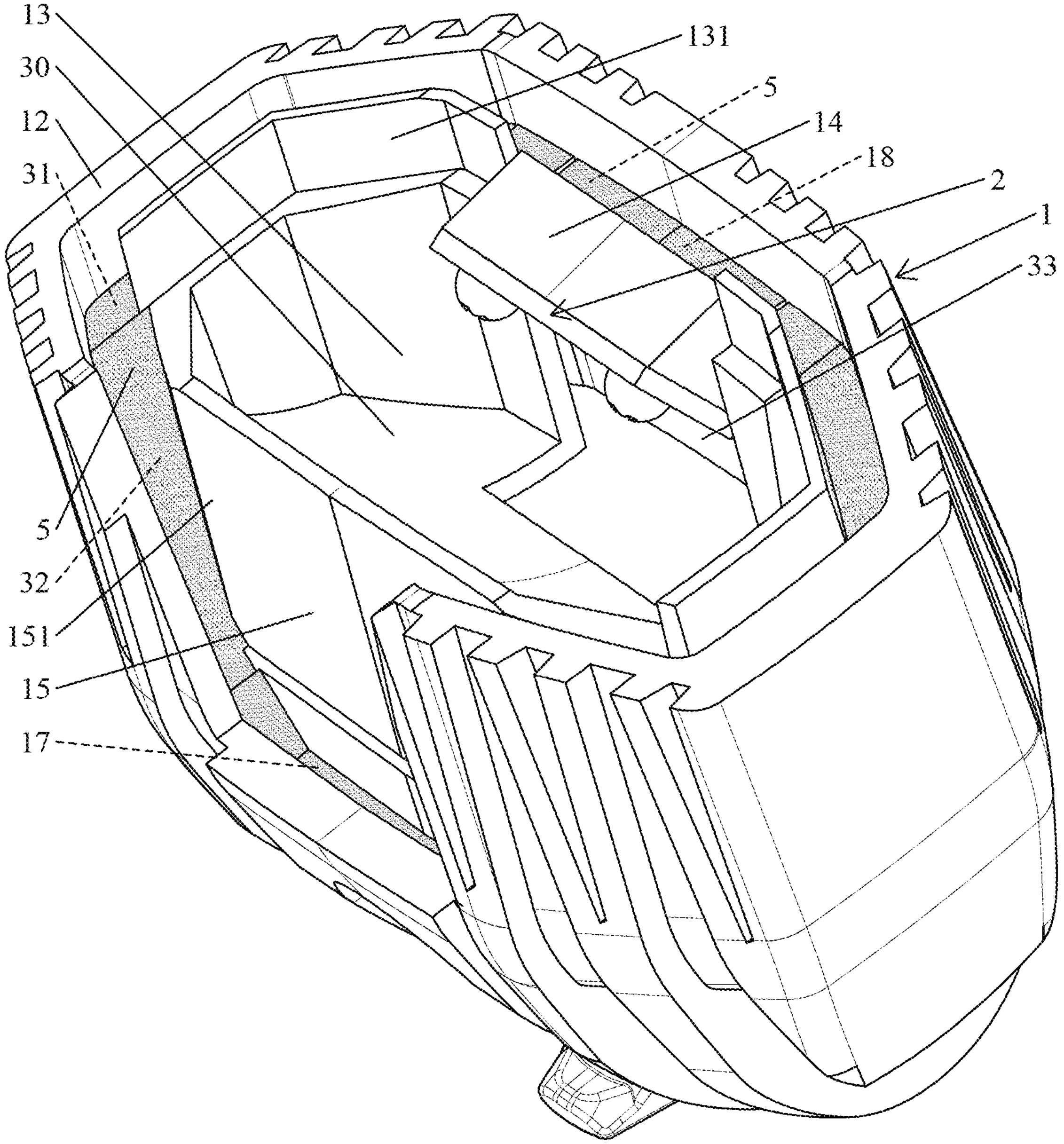
FIG. 4 is a perspective view of the housing and the optical element of the vehicle lamp according to the present invention after gluing.
Figure 5:
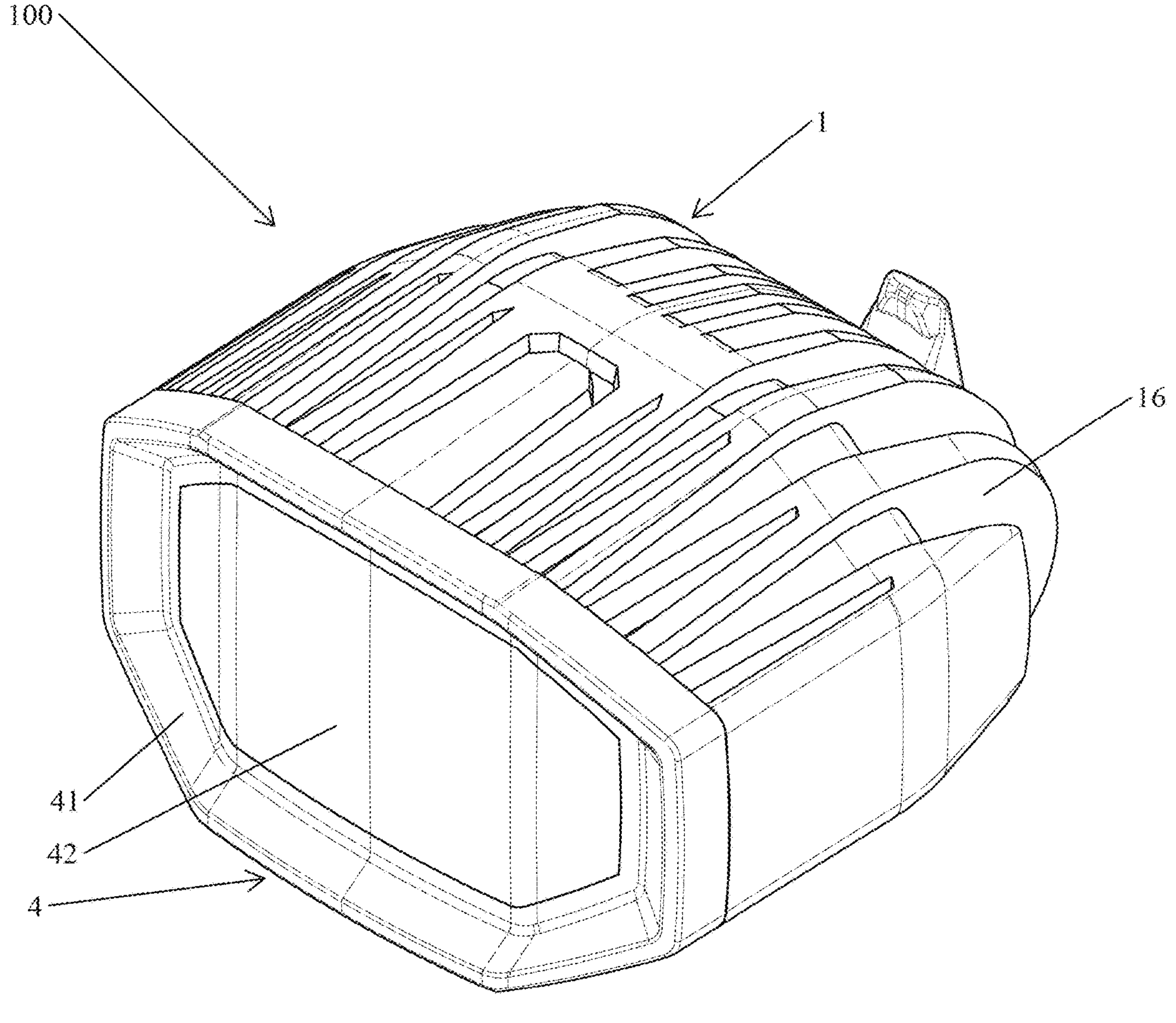
FIG. 5 is a perspective view of the vehicle lamp according to the present invention after assembly.
Figure 6:
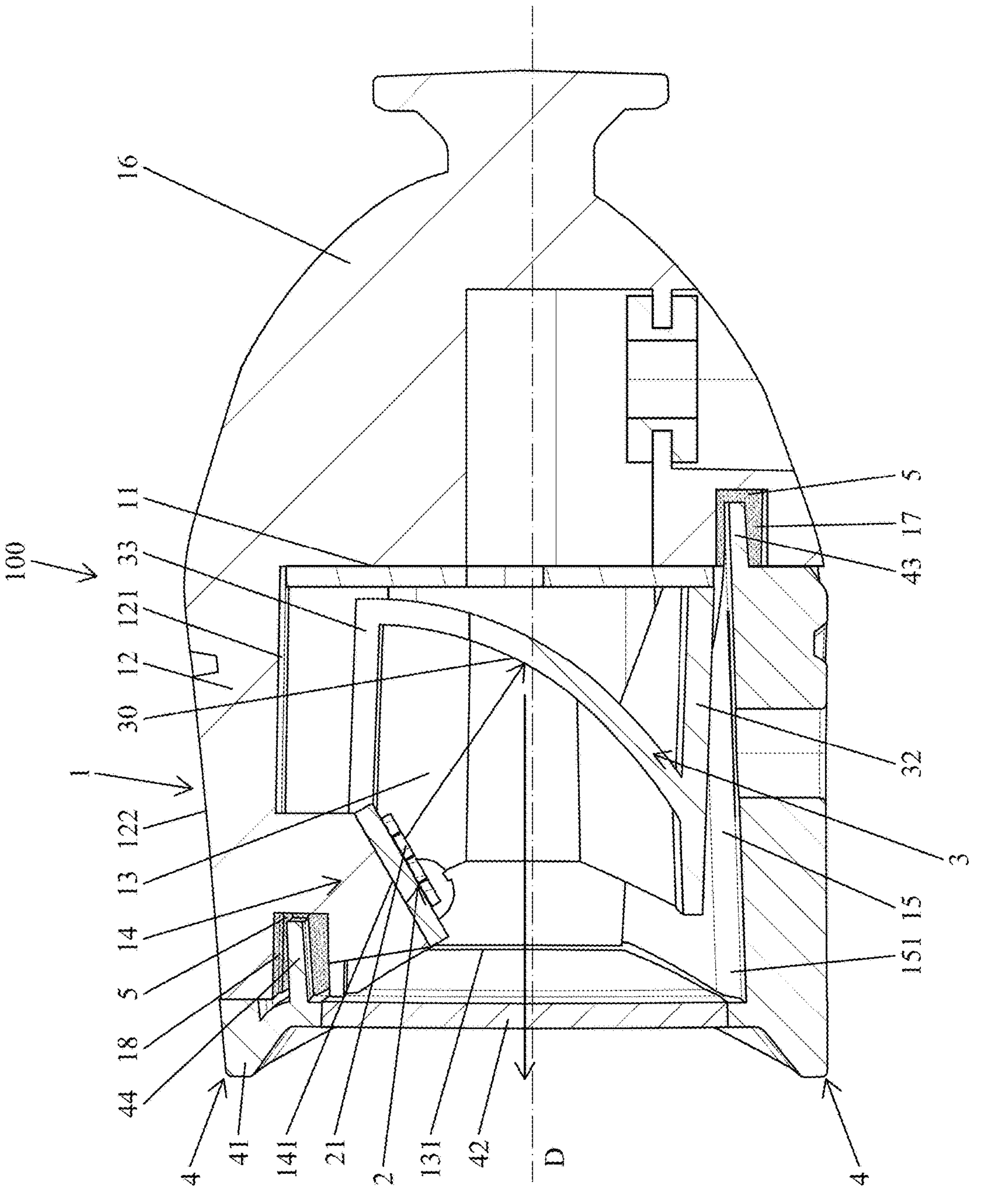
FIG. 6 is a cross sectional view of the vehicle lamp according to the present invention.

FIG. 1 is an exploded, perspective view of a vehicle lamp according to the present invention. FIG. 2 is a schematic view illustrating assembly of a housing and a circuit board of the vehicle lamp according to the present invention. FIG. 3 is a schematic view illustrating gluing of the housing and an optical element of the vehicle lamp according to the present invention. FIG. 4 is a perspective view of the housing and the optical element of the vehicle lamp according to the present invention after gluing. FIG. 5 is a perspective view of the vehicle lamp according to the present invention after assembly. FIG. 6 is a cross sectional view of the vehicle lamp according to the present invention. The vehicle lamp 100 according to the present invention is configured to be disposed on a vehicle body (not shown). A first direction D is defined in the front/rear direction of the vehicle body (not shown).

Figure 7:
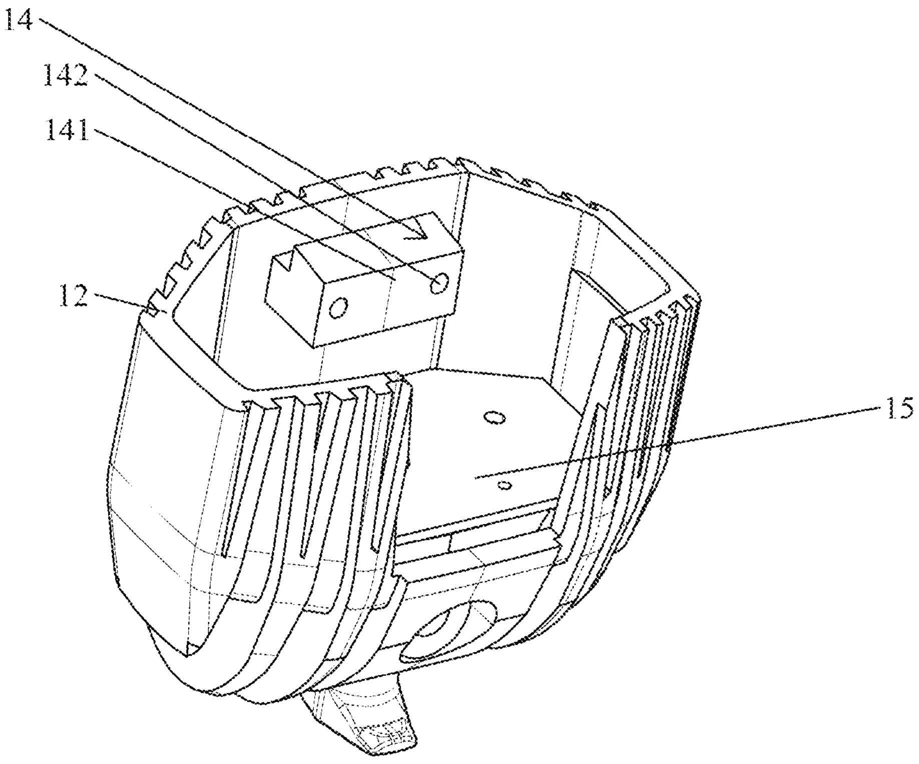
FIG. 7 is a schematic view illustrating, in another embodiment of the vehicle lamp according to the present invention, that the mounting face of the housing is parallel to the inner surface.

The vehicle lamp 100 according to the present invention comprises a housing 1, a circuit board 2, an optical element 3, and a front cover 4. The housing 1 includes a rear wall 11 and an annular wall 12 located in front of the rear wall 11 and connected to the rear wall 11. A chamber 13 is defined between the annular wall 12 and the rear wall 11 and includes a front end having an opening 131. The annular wall 12 includes an inner surface 121 and an outer surface 122. A carrier seat 14 protrudes from the inner surface 121 into the chamber 13. The housing 1 and the carrier seat 14 are integrally formed and are made of metal or include a material with high thermal conductivity, such as metal, graphite, carbon tube, diamond, aluminum nitride, silicon carbide, etc. The carrier seat 14 includes a mounting face 141 facing the chamber 13. In this embodiment, the mounting face 141 is planar. Furthermore, to match with the angle arrangement of the light rays to be emitted, the mounting face 141 is at a non-parallel angle to the inner surface 121 of the annular wall 12 on which the carrier seat 14 is located. In another embodiment, as shown in FIG. 7, the mounting face 141 is substantially parallel to the inner surface 121 of the annular wall 12 on which the carrier seat 14 is located.

Figure 8:
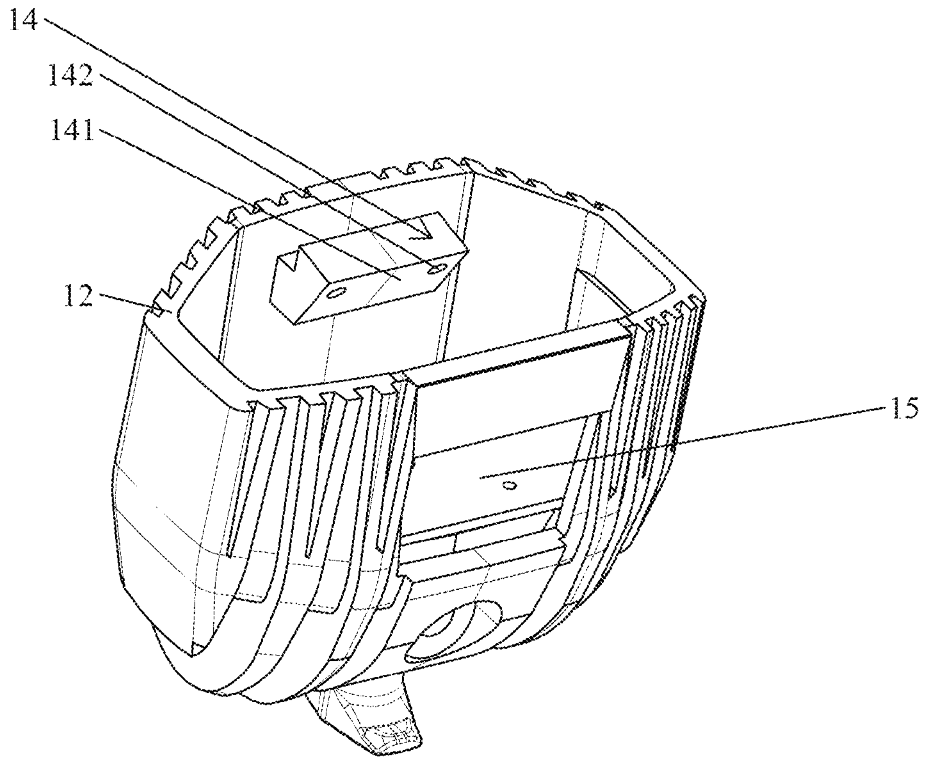
FIG. 8 is a schematic view illustrating an assembling opening of the housing in the form of a hole in another embodiment of the vehicle lamp according to the present invention.

The mounting face 141 is provided with at least one second mounting hole 142. In this embodiment, the mounting face 141 is spaced from the inner surface 121, and two second mounting holes 142 are provided and extend from the mounting face 141 toward the inner surface 121. In another embodiment (not illustrated), the housing 1 has a certain thickness per se, and the second mounting hole 142 may be directly formed in the inner surface 121. The annular wall 12 includes an assembling opening 15 which faces the mounting face 141. The assembling opening 15 is located in the vertical direction of the mounting face 141. The assembling opening 15 may be in the form of a first notch 151 facing forward. In another embodiment, as shown in FIG. 8, the assembling opening 15 may be in the form of a hole having an annular periphery without any notches. Furthermore, the housing 1 includes a plurality of heat dissipating fins 16 protruding from the outer surface 122 of the annular wall 12 of the housing 1. Furthermore, a first receiving groove 17 is provided behind the assembling opening 15, and a second receiving groove 18 is provided between the carrier seat 14 and the inner surface 121. The first receiving groove 17 and the second receiving groove 18 are located on two opposite sides of the housing 1, respectively.

The circuit board 2 includes at least one light emitting element 21 and at least one first mounting hole 22. The vehicle lamp 100 according to the present invention further comprises the at least one assembling element 23. In this embodiment, the circuit board 2 includes two first mounting holes 22 associated with the two second mounting holes 142. A vertical projection of each of the first mounting holes 22 and the second mounting holes 142 is substantially located in the assembling opening 15. The circuit board 2 can be disposed on the mounting face 141. As shown in FIG. 2, an external assembling device 6 can directly extend through the assembling opening 15, and two assembling elements 23 extend through the first mounting holes 22 of the circuit board 2 and the second mounting holes 142 of the mounting face 141 of the carrier seat 14 to assemble the circuit board 2 with the carrier seat 14. Thus, the vehicle lamp 100 according to the present invention enables rapid and easy assembly.

The optical element 3 is disposed in the chamber 13 and is configured to guide light rays emitted by the light emitting element 21 to the front of the vehicle lamp 100. The light emitting element 21 may be a light-emitting diode (LED). In this embodiment, the optical element 3 is a reflecting cover and includes a reflecting face 30 (see FIG. 4) for reflecting light rays. In another embodiment (not illustrated), the optical element 3 may be a lens for refracting or reflecting light. The optical element 3 includes at least one first sidewall 31 and at least one second sidewall 32 connected to the at least one first sidewall 31. The first sidewall 31 of the optical element 3 is disposed annularly and faces the inner surface 121 of the annular wall 12. Furthermore, an extending direction of the first sidewall 31 is at an angle A1 of about 75 degrees to the first direction D. In this embodiment, the optical element 3 includes two second sidewalls 32 protruding toward the inner surface 121 of the annular wall 12. The two second sidewalls 32 face the inner surface 121 of the annular wall 12, and the positions of the two second sidewalls 32 are approximately aligned with the assembling opening 15. Furthermore, the spacing between the two second sidewalls 32 decreases gradually toward a rear end of the optical element 3. In this embodiment, the extending direction of each of the two second sidewalls 32 is at an angle A2 of about 30 degrees to the first direction D, as shown in FIG. 3. In another embodiment (not illustrated), the angle A2 between the extending direction of each of the two second sidewalls 32 and the first direction D is smaller than 90 degrees and not smaller than 30 degrees. Furthermore, the optical element 3 is provided with a second notch 33 corresponding to the carrier seat 14. Two portions of the first sidewall 31 on two sides of the second notch 33 are approximately aligned with the second receiving groove 18.

The front cover 4 is coupled with the housing 1 and substantially seals the opening 131. The front cover 4 includes an outer frame 41 and a light-transmitting lens 42 disposed in a central portion of the outer frame 41. The outer frame 41 includes a shielding portion 43 protruding rearward to cover the assembling opening 15. Furthermore, the outer frame 41 is provided with an annular plate portion 44 which protrudes rearward and which may be inserted between the optical element 3 and the inner surface 121 of the housing 1. In another embodiment (not illustrated), the shielding portion 43 may be a separate element for covering the assembling opening 15.

The housing 1, the optical element 3, and the front cover 4 are bonded together by a glue 5. Specifically, the first and second sidewalls 31 and 32 of the optical element 3 are bonded to the inner surface 121 of the annular wall 12 of the housing 1 by the glue 5. According to the present invention, with reference to FIGS. 3 and 4, the glue 5 may be applied by an external glue applying machine 7. With the optical element 3 disposed in the chamber 13 of the housing 1, the glue applying machine 7 extends through the opening 131, such that an end of the glue applying machine 7 may move along the first and second sidewalls 31 and 32 to spray the glue 5. When the glue applying machine 7 moves to the second sidewalls 32, the glue applying machine 7 may follow the inclination angle of the second sidewalls 32 to spray the glue 5 without interruption. When the glue applying machine 7 moves to a position behind the assembling opening 15, the glue 5 may be applied to an area where the first receiving groove 17 locates. When the glue applying machine 7 moves to another position aligned with the second notch 33, the glue 5 may be applied to an area where the second receiving groove 18 locates. Therefore, according to the present invention, application of the glue 5 is not affected by the assembling opening 15 and the second notch 33, and the glue 5 is annularly and continuously applied to the inner surface 121 of the annular 12 of the housing 1, thereby increasing the bonding effect and airtightness between the housing 1, the optical element 3, and the front cover 4.

As shown in FIGS. 5 and 6, before the glue 5 is dried and hardens, the front cover 4 is mounted to the front end of the housing 1 and substantially seals the opening 131. The shielding portion 43 may cover the assembling opening 15. Furthermore, the annular plate portion 44 may be bonded between the inner surface 121 of the housing 1 and the optical element 3 and in the second receiving groove 18 by the glue 5. Furthermore, the rear end of the shielding portion 43 may be inserted into the first receiving groove 17 and may be bonded by the glue 5. After the glue 5 is dried and hardens, the housing 1, the optical element 3, and the front cover 4 are stably coupled as an integral member.

According to the present invention, by the provision of the assembling opening 15, when the circuit board 2 is disposed on the mounting face 141 of the carrier seat 14, rapid and easy assembly may be achieved by extending the external assembling device 6 through the assembling opening 15. Furthermore, when the light emitting element 21 emits light, the light rays may be reflected by the reflecting face 30 to the front of the vehicle lamp 100 while providing a predetermined lighting pattern. The heat sources of the light emitting element 21 may be transferred through the circuit board 2 to the carrier seat 14 and, thus, dissipated by the housing 1. Therefore, according to the present invention, since the carrier seat 14 is a part of the housing 1, when the heat generated by the light emitting element 21 is transferred through the gap between the circuit board 2 and the mounting face 141 to the carrier seat 14, the heat is dissipated outward through the housing 1. The heat transfer path includes only one air gap, thereby providing a better heat transfer efficiency. Furthermore, the housing 1 according to the present invention is a single piece with a larger cooling area, thereby enhancing the cooling effect.

In view of the foregoing, the vehicle lamp 100 according to the present invention provides enhanced cooling efficiency and easy and stable assembly.

The foregoing embodiments are examples of the present invention, not limitation to the present invention. All equivalent changes made in accordance with the spirit of the present invention should also fall within the scope of the present invention.

The invention claimed is:

1. A vehicle lamp, with a first direction defined in a front/rear direction, with the vehicle lamp comprising:

a housing including a rear wall and an annular wall located in front of the rear wall and connected to the rear wall, wherein a chamber is defined between the annular wall and the rear wall and includes a front end having an opening, wherein the annular wall includes an inner surface, wherein a carrier seat protrudes from the inner surface into the chamber, wherein the carrier seat includes a mounting face facing the chamber, and wherein the annular wall includes an assembling opening facing the mounting face;

a circuit board including at least one light emitting element and at least one first mounting hole, wherein the circuit board is disposed on the mounting face;

an optical element disposed in the chamber and configured to guide light rays emitted by the at least one light emitting element; and a front cover coupled with the housing, wherein the front cover substantially seals the opening, and wherein a vertical projection of the at least one first mounting hole is substantially located in the assembling opening.

2. The vehicle lamp as claimed in claim 1, further comprising at least one assembling element, the at least one assembling element comprising bolts, screws, and/or nail, wherein the mounting face is provided with at least one second mounting hole, wherein the at least one assembling element extends through the at least one first mounting hole of the circuit board and the at least one second mounting hole of the mounting face of the carrier seat to assemble the circuit board with the carrier seat.

3. The vehicle lamp as claimed in claim 1, wherein the assembling opening is a first notch extending in a forward direction along the annular wall.

4. The vehicle lamp as claimed in claim 1, wherein the assembling opening is a form of a hole.

5. The vehicle lamp as claimed in claim 1, wherein the mounting face is planar and is substantially parallel to the inner surface of the annular wall on which the carrier seat is located.

6. The vehicle lamp as claimed in claim 1, wherein the mounting face is planar and is substantially at a non-parallel angle to the inner surface of the annular wall on which the carrier seat is located.

7. The vehicle lamp as claimed in claim 1, wherein the housing and the carrier seat are integrally formed and are made of metal or include a material with high thermal conductivity.

8. The vehicle lamp as claimed in claim 1, wherein the housing includes a plurality of heat dissipating fins protruding from an outer surface of the housing.

9. The vehicle lamp as claimed in claim 1, wherein the optical element includes at least one first sidewall and at least one second sidewall connected to the at least one first sidewall, and wherein the at least one first sidewall and the at least one second sidewall of the optical element are bonded to the inner surface of the annular wall by a glue.

10. The vehicle lamp as claimed in claim 9, wherein the at least one second sidewall is aligned with the assembling opening.

11. The vehicle lamp as claimed in claim 9, wherein the at least one second sidewall includes two second sidewalls protruding toward the inner surface of the annular wall, wherein a spacing between the two second sidewalls decreases gradually toward a rear end of the optical element, and wherein an extending direction of each of the two second sidewalls is at an angle of about 30 degrees to the first direction.

12. The vehicle lamp as claimed in claim 9, wherein the at least one second sidewall includes two second sidewalls protruding toward the inner surface of the annular wall, wherein a spacing between the two second sidewalls decreases gradually toward a rear end of the optical element, wherein an extending direction of each of the two second sidewalls is at an angle to the first direction, and wherein the angle is smaller than 90 degrees and not smaller than 30 degrees.

13. The vehicle lamp as claimed in claim 9, wherein the glue is annularly and continuously applied to the inner surface of the annular wall of the housing.

14. The vehicle lamp as claimed in claim 1, wherein the front cover includes an outer frame and a light-transmitting lens, wherein the light-transmitting lens is disposed in a central portion of the outer frame, and wherein the outer frame includes a shielding portion protruding rearward to cover the assembling opening.

15. The vehicle lamp as claimed in claim 1, wherein the optical element is a reflecting cover.

16. A vehicle lamp comprising:

a housing including a chamber, an inner surface, and an assembling opening, wherein a carrier seat is disposed on the inner surface and includes a mounting face aligned with the assembling opening;

a circuit board disposed in the chamber;

an optical element disposed in the chamber; and a front cover substantially covers the chamber, wherein a vertical projection of at least a portion of the mounting face is substantially located in the assembling opening.

17. The vehicle lamp as claimed in claim 16, wherein the mounting face is provided with at least one mounting hole, and wherein a vertical projection of the at least one mounting hole of the mounting face is substantially located in the assembling opening.

18. The vehicle lamp as claimed in claim 17, further comprising at least one assembling element, the at least one assembling element comprising bolts, screws, and/or nails, wherein the at least one assembling element extends through the at least one mounting hole of the mounting face to fix the circuit board to the mounting face.

19. The vehicle lamp as claimed in claim 16, wherein the carrier seat protrudes from the inner surface into the chamber, wherein the housing and the carrier seat are integrally formed and are made of metal or include a material with high thermal conductivity.

20. A vehicle lamp comprising:

a housing including a chamber, an inner surface, and an assembling opening, wherein the inner surface includes a mounting face aligned with the assembling opening;

a circuit board disposed in the chamber;

an optical element disposed in the chamber; and at least one assembling element, the at least one assembling element comprising bolts, screws, and/or nails;

wherein the at least one assembling element and the circuit board are assembled on the mounting face by an external assembling device through the assembling opening, wherein the external assembling device is a tool for fastening the at least one assembling element.

* * * * *